Figure 1:
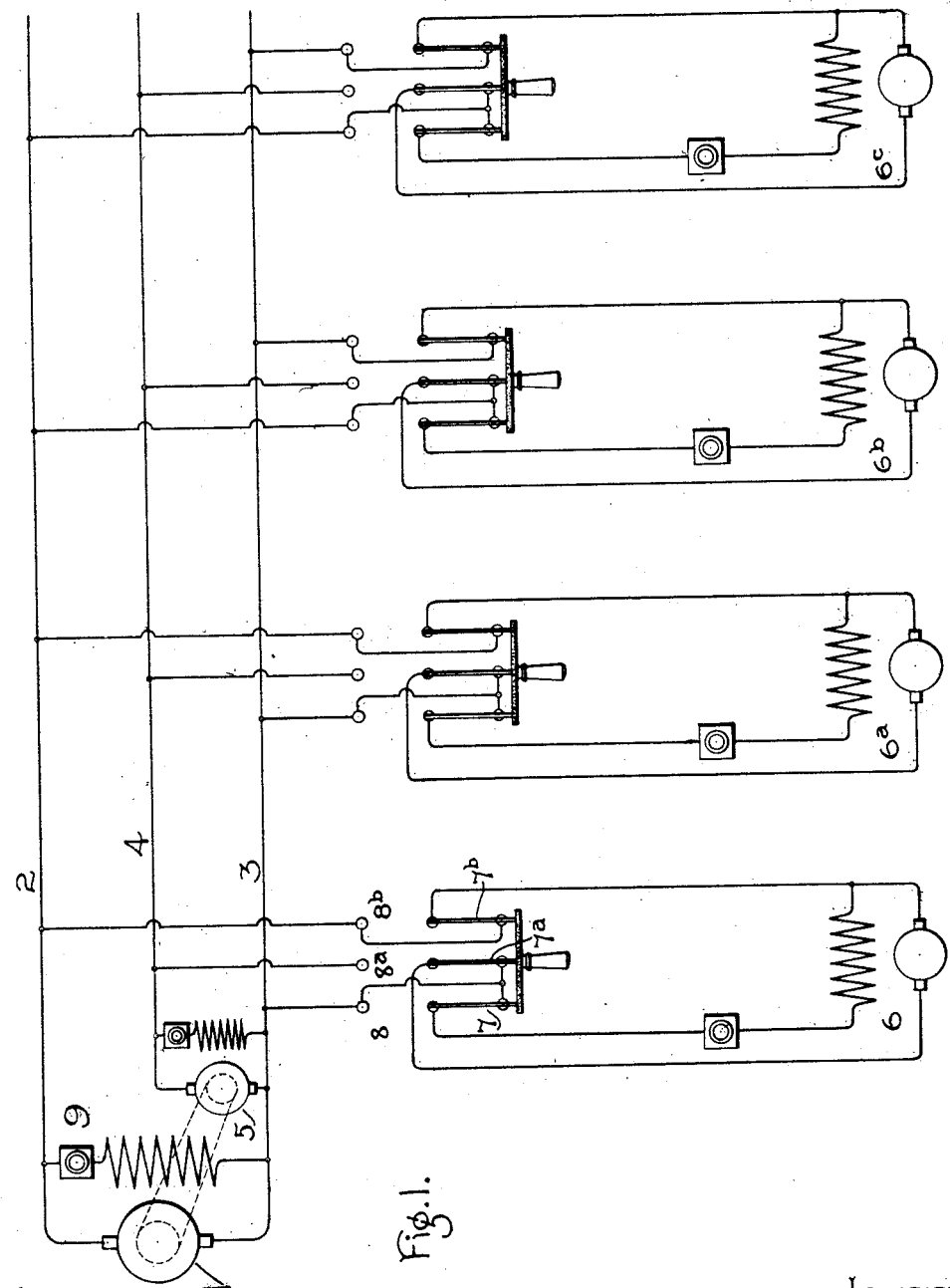

No. 696,946. Patented Apr. 8, 1902.
M. W. DAY.
CONTROLLING ELECTRIC MOTORS.
(Application filed July 12, 1899.)

(No Model.) 2 Sheets—Sheet 1.

Witnesses.
Edward Williams, Jr.
A. F. Macdonald.

Inventor.
Maxwell W. Day,
by Albert G. Davis
Atty.

No. 696,946. Patented Apr. 8, 1902.
M. W. DAY.
CONTROLLING ELECTRIC MOTORS.
(Application filed July 12, 1899.)
(No Model.) 2 Sheets—Sheet 2.

Witnesses.
Edward Williams, Jr.
A. F. Macdonald.

Inventor:
Maxwell W. Day,
by Albert G. Davis
Atty.

UNITED STATES PATENT OFFICE.

MAXWELL W. DAY, OF SCHENECTADY, NEW YORK, ASSIGNOR TO THE GENERAL ELECTRIC COMPANY, A CORPORATION OF NEW YORK.

CONTROLLING ELECTRIC MOTORS.

SPECIFICATION forming part of Letters Patent No. 696,946, dated April 8, 1902.

Application filed July 12, 1899. Serial No. 723,625. (No model.)

*To all whom it may concern:*

Be it known that I, MAXWELL W. DAY, a citizen of the United States, residing at Schenectady, county of Schenectady, State of New York, have invented certain new and useful Improvements in Controlling Electric Motors, (Case No. 1,064,) of which the following is a specification.

This invention relates to systems for controlling electric motors, the object being to permit motors of standard types of construction to be operated at variable speeds.

In carrying out my invention I carry through the neighborhood in which the motors are installed or located three distributing-wires, two of which connect with the terminals of the generator of the supply system and the third of which is a compensating or equalizing wire corresponding in some respects to the neutral wire of a three-wire supply system. Between this wire and one side of the system I interpose an auxiliary dynamo, which acts as a potential-equalizer and balances the load on the two sides of the system, acting either as a generator or motor, according to the inequality of balance. This auxiliary machine may in some cases be installed at the same station as the supply-generator and may be belted thereto, or it may in some cases be located at a distant point and be driven by current derived from the system. The potential of this auxiliary machine may be adjusted to equal to one-half of that of the main generator, or it may in some cases be less than half of that of the main generator. The motors supplied by the system are installed so that in the normal condition of load, where all the motors are operating at one speed, the load will be equally distributed between the two sides of the system. The switch is so arranged that the motors may be coupled between the compensating wire and one of the outside wires or between the two outside wires, thereby imposing a different voltage, and therefore a different speed, on the motors. The field-magnets may be maintained constant. The motor connections are so arranged that when all the motors are operated at the lower speed the load will be equally divided between the two sides of the system—that is to say, part of the motors will be between one line-wire and the compensating wire and a part between the other line-wire and the compensating wire. When, however, all the motors on one side of the system and only part of the motors on the other side are operating at the higher speed, the balance of load will be destroyed and the auxiliary dynamo will act as a compensator, either by making up for the excess of load on the side on which it is located by acting as a generator or by absorbing the deficiency of load by acting as a motor and helping to drive the main generator. Obviously, therefore, the maximum range of inequality in a system of this kind necessary to compensate will be one-fourth the capacity of the driven motors, and by making an auxiliary dynamo of this capacity all or any number of the motors may be operated at full or fractional speed, as desired. This will be readily appreciated from the fact that the auxiliary dynamo delivers a fractional electromotive force—in the case above described one-half of that of the main generator—and since when it is doing the maximum duty as a generator it can feed but half of the motors on the system by reason of the arrangement of the motor-switches its maximum output is one-quarter that of the main generator. A further range of variation in speed may be provided for by employing a rheostat in the field-magnet circuit of each motor.

My invention therefore comprises a system of control for electric motors having a main generator and two distributing-wires and a third wire of intermediate potential, between which and one of the outside wires is inserted a compensating device to maintain the balance on the two sides of the system.

It comprises also a system of the character just noted in which the motors are connected by switches, so that they may be put in circuit with the high-potential or low-potential distributing-wires and operated at different speeds.

It comprises also such a system of distribution in which with certain speed adjustments the motors will be distributed between the two sides of the system, so as to maintain a balance, and when the balance is destroyed the auxiliary dynamo will act as a compensator to restore the balance.

Referring now to the drawings, Figure 1 is a diagram showing a system embodying my improvements. Figs. 2, 3, 4, and 5 are diagrams showing different conditions of the motor distribution-circuit.

1 represents a supply-generator located at the central station or any other suitable point from which distribution is desired. 2 and 3 are distribution-wires leading from such generator through the neighborhood in which motors or other translating devices are to be installed. I prefer to operate with shunt-wound generators and motors, though my improvements are not necessarily limited thereto and may be employed in connection with motors of other types.

Between one of the main distributing-wires and the third wire 4 I interpose an auxiliary dynamo 5. This forms of the system, at least at the point at which the motor distribution is installed, a three-wire system. In the diagram I have shown the auxiliary dynamo as located at the central station and as belted to the main generator. This, however, is not at all necessary, as will readily be appreciated by those familiar with the art, since the auxiliary dynamo may be independently driven and may be located elsewhere than at the generating-station. The function of the auxiliary dynamo is to maintain an equality of balance on the two sides of the system. The driven motors 6 $6^a$ $6^b$ $6^c$ have their service-wires connected with the system 2 3 4, so that half the load is between the wires 2 and 4 and half between the wires 3 and 4 when the motors are all at low speed. Thus, as shown in Fig. 1, each motor is provided with a three-blade switch adapted to engage the terminals 7 $7^a$ $7^b$ or 8 $8^a$ $8^b$. In the former condition the motor is connected to the high-potential mains 2 and 3. It will be evident, however, that when the switch is thrown so as to engage the contacts 8 $8^a$ $8^b$ the voltage will be reduced to that between the mains 3 and 4 or 2 and 4, and the motor will therefore be driven at fractional speed. As will be evident on examination of the diagram, the field-magnet is maintained constant by being connected in both switch positions between the mains 2 and 3. I prefer to operate the system so that the voltage between the mains 3 and 4 will be half that between the mains 2 and 3, though this is not absolutely essential, as there may be a greater or less difference. In the former case but two motor speeds would be available—namely, half and full speed—besides the small range of difference afforded by the field-regulating rheostat 9, whereas in the latter a three-step speed would be possible, provided, of course, a suitable switch capable of connecting the motor alternately between the mains 2 and 3, 2 and 4, and 3 and 4 be provided. As shown in Fig. 1, the switches are thrown so that all the motors are connected between the mains 2 and 3 and are therefore in position to operate at full speed. If, however, all the switches were thrown to the open sets of contacts, it will be evident that motors 6 $6^a$ will be served by the mains 2 and 4, whereas the motors $6^b$ $6^c$ will be served by the mains 3 and 4. Whatever be the number of motors, the distribution of their contacts should be such as to maintain this relation, so that the load will be as nearly as possible divided between the two sets of supply-wires. The motor-fields are connected across the high-potential mains, as indicated in Fig. 1, so that their speed variation is controlled by the different potentials imposed on the armature in different positions of the switch.

Figure 2:
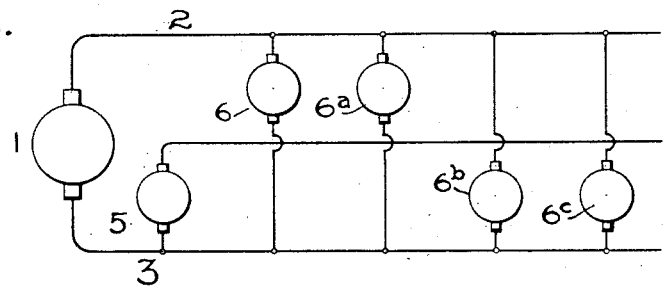
Figure 3:
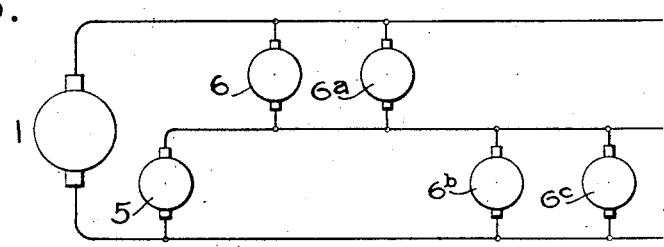
Figure 4:
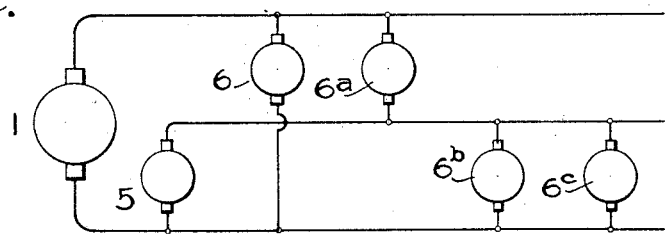
Figure 5:
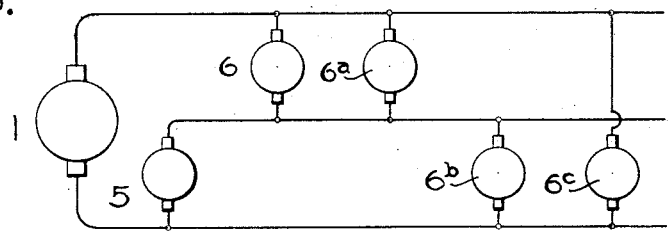

The different conditions of service are exemplified in Figs. 2, 3, 4, and 5. In Fig. 2 all four motors 6 $6^a$ $6^b$ $6^c$ are operating at full speed and with their terminals connected across the high-potential mains 2 3. The auxiliary dynamo is on open circuit and is therefore doing no work. In Fig. 3 all four motors are shown as operating at half-speed and according to the principle of distribution hereinbefore described the load is equally divided on the two sides of the system and the auxiliary dynamo 5 is again doing no work. In Fig. 4 the motor 6 is operating at full speed and all the others at half-speed. The load here is unequally divided on the two sides of the system and the equalizing or compensating agent 5 acts as a generator to supply one motor. In Fig. 5 the load is again unequally divided, the excess of load being on the side of the system in which the compensating agent is not located, the motors 6 $6^a$ $6^b$ operating at half-speed and $6^c$ at full speed. In this case the auxiliary dynamo acts as a motor and loads the side of the system in which it is connected sufficiently to compensate for the inequality of balance and in an organization such as shown in Fig. 1 help to drive the main generator. The auxiliary dynamo is doing maximum duty as a generator when there are no motors connected between mains 2 and 4 and all of the motors supplied by mains 3 and 4 are connected and is doing maximum duty as a motor when no motors are supplied by mains 3 and 4 and all the motors supplied by mains 2 and 4 are connected in the circuit. In the former case the main generator is doing no work and the auxiliary dynamo is doing maximum duty. In the latter case the auxiliary dynamo is operating as a motor and is assisting the main generator. Supposing the potential of the auxiliary dynamo to be half that of the main generator, its capacity need be only one-fourth that of the motors installed. Thus if each of the four motors installed have a capacity of ten kilowatts it would be sufficient to give the auxiliary dynamo a capacity of ten kilowatts. In the case, however, where more than two steps in the speed are provided for—as, for example, in the case where the potential of the dynamo 5 would be fixed at one hundred volts and that of the generator 1 at two hundred and fifty volts—the auxiliary dynamo should be slightly larger in capacity, in the particular case instanced having four-tenths of the total capacity of the motors.

In an organization of the character described herein motors of the standard type and of cheap construction may be installed and operated at variable speeds either on a circuit supplied from a central station or from a local generating-circuit.

A system of the kind herein described is particularly useful for operating machine-tools where a system is already installed at some standard voltage and where it may be desired to run the machines at a variable speed without incurring the comparatively great expense of variable-speed motors.

What I claim as new, and desire to secure by Letters Patent of the United States, is—

1. A system of control for electric motors, comprising a plurality of distributing-wires carrying different electric potentials, motors supplied thereby, controlling devices for imposing different potentials on the motors, connections with the motors whereby at normal speeds they are distributed between different pairs of wires, and an equalizing device for maintaining an electrical balance in the system when some of the motors are connected for high speeds.

2. A system of control for electric motors, comprising three distributing-wires having different electric potentials, motors connected at normal speeds between different pairs of wires, means for connecting the several motors between the high-potential wires and an auxiliary generator of less capacity than the main generator, connected between the low-potential wires and adapted to absorb or yield energy according to the distribution of load on the system.

3. A system of motor control comprising a three-wire distributing system, motors connected between the wires so as to equally divide the load on the two sides of the system at normal motor speeds, switches for connecting any motor between the high-potential wires, and an auxiliary generator between the neutral or compensating wire and an outside wire.

4. A system of motor control comprising a three-wire distributing system, motors connected between the wires to equally divide the load on the two sides of the system at normal motor speeds, switches for connecting any motor with the high-potential wires, and an auxiliary compensating generator between a pair of low-potential wires belted or otherwise connected to the main generator and having a fractional electromotive force relatively to that of said main generator.

5. A system of motor control comprising a three-wire distributing system, motors connected between the wires to equally divide the load on the two sides of the system at normal motor speeds, switches for connecting any motor with the high-potential wires, and an auxiliary compensating generator between a pair of low-potential wires having a fractional capacity and fractional electromotive force relatively to that of the main generator.

In witness whereof I have hereunto set my hand this 11th day of July, 1899.

MAXWELL W. DAY.

Witnesses:
BENJAMIN B. HULL,
MABEL E. JACOBSON.